United States Patent

[11] 3,594,581

[72] Inventor Hajime Yamashita
Tokyo, Japan
[21] Appl. No. 777,301
[22] Filed Nov. 20, 1968
[45] Patented July 20, 1971
[73] Assignee Kabushiki Kaisha Ricoh
Tokyo, Japan
[32] Priority Nov. 27, 1967
[33] Japan
[31] 42/75988

[54] ROLL MICROFILM AND RETRIEVING DEVICE AND METHOD OF RETRIEVING
8 Claims, 4 Drawing Figs.

[52] U.S. Cl. .................................................. 250/256,
352/92, 353/26
[51] Int. Cl. ........................................................ G01n 21/30,
G03b 23/12, G06k 7/14
[50] Field of Search .................................................. 352/92,
123; 353/25, 26, 27, 120; 250/219

[56] References Cited
UNITED STATES PATENTS
3,299,272 1/1967 Furukawa et al. ............ 250/219
3,212,399 10/1965 Walter .......................... 352/92 X
FOREIGN PATENTS
799,427 8/1958 Great Britain ................ 353/25

Primary Examiner—Louis R. Prince
Assistant Examiner—Joseph W. Roskos
Attorney—Burgess, Ryan and Hicks ABSTRACT: A roll microfilm-retrieving device wherein a plurality of small signal marks disposed in a predetermined unequally spaced relation with respect to each other in each side edge portion of each of frames of the film are detected by a detecting device wherein a plurality of detecting elements whose number is the same with that of signal marks are disposed in the same relation with said relation of said marks, whereby a desired frame is located or retrieved by a number or counts of detection of said detecting device.

PATENTED JUL 20 1971 3,594,581

INVENTOR.
HAJIME YAMASHITA
ATTORNEYS

ROLL MICROFILM AND RETRIEVING DEVICE AND METHOD OF RETRIEVING

BACKGROUND OF THE INVENTION

The present invention relates to a roll microfilm-retrieving method and a device therefor and more particularly a roll microfilm-retrieving method and a device therefor of the type wherein a desired frame of the microfilm may be located by utilizing small signal marks disposed in each side edge portion exterior of each frame of the microfilm.

There has been known such a roll microfilm-retrieving device wherein a desired frame is located or retrieved by detecting a signal mark disposed in a side portion of each frame of the microfilm. For example, as shown in FIGS. 1 and 2, one substantially square, relatively large-sized and black-colored signal mark 2 is disposed in each of the side edge portions $B_1$, $B_2$, $B_3$, ..... $B_n$ respectively corresponding to frames $A_1$, $A_2$, $A_3$, ..... $A_n$ of a roll microfilm 1, and the roll microfilm is advanced between a photosensitive element 3 and a illumination light source 4 which is disposed opposite to the photosensitive element 3 so that a number of frames of the roll microfilm may be counted thereby retrieving a described frame. The dimensions of a conventional 35mm. roll microfilm which has been used in conjunction with the conventional roll microfilm-retrieving method as described above are such that each frame is 39mm. ×28mm. with the center of the frame being along the longitudinal central axis of the roll film; the width of the edge portion is 3.5mm; and the signal mark is a square of 2.5mm. ×2.5mm. with the center being located along the transverse central line of the frame.

The reasons why relatively large-sized signal marks are attached to a roll microfilm are that (1) erratic actuation of photosensitive element due to dust particles or the like attached to the microfilm can be prevented and (2) the sensitivity of the photosensitive element sued in the conventional device of the type described is not sufficient. Such large-sized signal marks as described above inevitably require the broader width of the side edge portion so that the frame size is rather limited to a smaller size. Consequently, reductions are generally limited to small reduction in order to prevent the reduction of the resolution power of a negative or positive picture depending upon the informations to be recorded and at the same time the magnification or enlargement must be reduced by the same reason as described above. Therefore, the conventional roll microfilm retrieving device as described above is not satisfactory to meet the ever-increasing demand in the information field for recording more complex, wider and more informations in a minimized number of frames in order to facilitate the information storage and retrieval.

SUMMARY OF THE INVENTION

The present invention therefore has for its object to provide an improved roll microfilm-retrieving device wherein a plurality of small signal marks disposed in predetermined spaced-apart relation with respect to each other upon each edge portion of each frame of the roll microfilm are detected by the same number of photosensitive elements so as to detect a number of frames.

According ro one preferred embodiment of the present invention, a plurality of relatively small-sized signal marks are disposed in a predetermined relationship in each of the side edge portions of the frames of a roll microfilm. When the roll microfilm having the signal marks as described above is advanced through the signal mark detecting device of the present invention, these signal marks can be detected by means of a plurality of detecting elements which are disposed in the same relationship with that of said signal marks. The retrieval of a desired frame can be effected by counting the number of detections of such signal marks. A detecting elements generally photoelectric transducer elements are used in such a manner that they detect the light transmitted through the roll microfilm from a light source disposed behind the roll microfilm in opposition to the detecting elements so as to detect whether the transmitted lights are incident thereupon or not. Alternatively, the detecting elements of the type described may be so arranged and disposed in such a manner they detect the intensity of the light which are radiated from a light source disposed on the same side of the detecting elements toward the roll microfilm and are reflected thereby. According to the aspect of the present invention, when detection of the transmitted lights is employed, a light source is disposed in and held stationary with respect to a transparent hollow drum together with a reflecting mirror. The roll microfilm to be retrieved is advanced over the transparent hollow drum by means of suitable guides and the signal marks are detected by the detecting elements.

One of the objects of the present invention is therefore to utilize as much as possible a limited area of a roll microfilm for recording informations.

Another object of the present invention is to provide a device compact in size, simple in construction, inexpensive to manufacture and reliable for accurately retrieving a desired frame of the roll microfilm.

Other objects and advantages of the present invention will be apparent from the following description of a preferred embodiment thereof, taken in conjunction with the accompanying drawing.

DESCRIPTION OF THE PREFERRED EMBODIMENT

Figure 1:
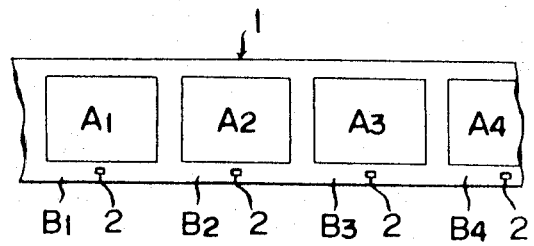
FIG. 1 is a plan view illustrating one part of a roll microfilm having conventional signal marks for retrieval.
Figure 2:
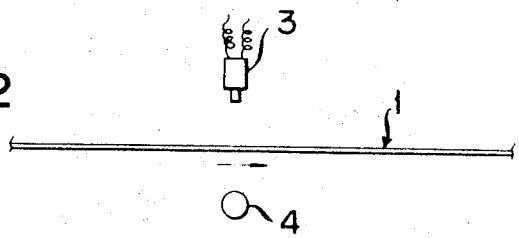
FIG. 2 is an explanatory view illustrating a signal mark-detecting portion of a conventional roll microfilm-retrieving device.
Figure 3:
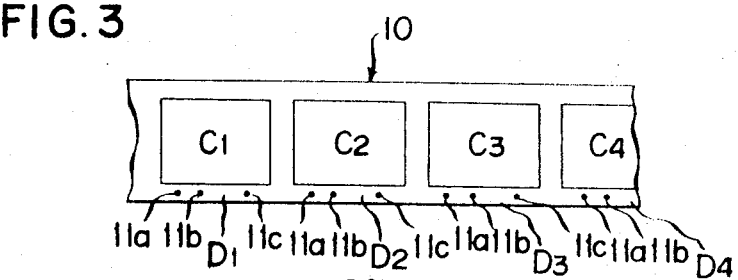
FIG. 3 is a partial plan view of one embodiment of a roll microfilm having the signal marks according to the present invention.
Figure 4:
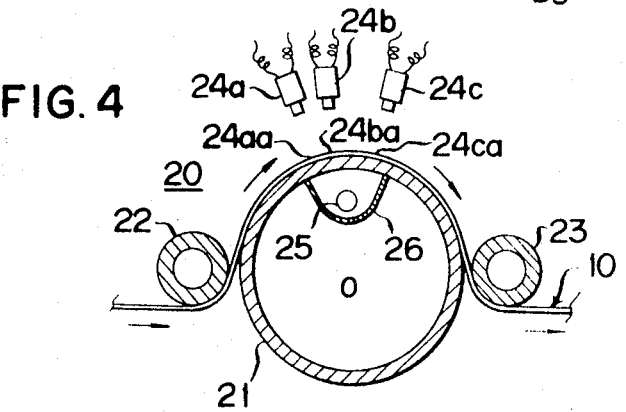
FIG. 4 is an explanatory view illustrating one embodiment of the construction of the signal mark-detecting portion for retrieval of the roll microfilm shown in FIG. 3.

Referring to FIGS. 3 and 4, a group of small round black-colored signal marks 11a, 11b and 11c are photographed, developed and fixed together with picture frames in each of edge portions $D_1$, $D_2$, $D_3$, .....$D_n$ corresponding to frames $C_1$, $C_2$, $C_3$, ..... $C_n$. The dimension of a small signal mark may be reduced as far as a conventional highly sensitive photosensitive element can detect the small signal mark. For example, in case of a 35mm. roll film, it has been found that the diameter of a signal mark may be reduced to the order from 0.5mm. to 1.0mm. Therefore, the width of the edge portion which has been determined to be 3.5mm. may be conveniently reduced to 1.5mm. to 2.0mm. so that the width of each frame can be accordingly enlarged by a length corresponding to the reduced width of the side edge portion, whereby the high resolution power and the retrieval accuracy may be attained in copying and printing. Since three small signal marks 11a, 11b and 11c are equidistantly spaced from the side edge of the film with marks 11a and 11b closer than marks 11b and 11c, it will hardly happen that the dust particles and the like having the same diameter with that of a small signal mark are aligned or spaced in the same order as in the case of the signal marks, so that the erratic actuation of the retrieving photosensitive element by the dust particles or the like can be completely prevented.

A retrieving device generally indicated by reference numeral 20 includes a hollow drum 21 made of a suitable transparent material and guide rollers 22 and 23 which are rotatably carried by suitable shafts respectively. A roll microfilm 10 is wrapped around a lower periphery of the guide roll 22, over the upper periphery of the drum 21 and over the lower periphery of the guide roller 23, and thereafter advanced to the next stage. When the hollow drum 21 is rotated in the direction indicated by the arrow by a suitable prime mover not shown, then the roll microfilm 10 is advanced as indicated by the arrows. Upwardly of the drum 21 are disposed photosensitive elements 24a, 24b and 24c which may be for example photoelectric tubes in such a manner that each optical axis of the photosensitive elements intersects the center of the drum 21. Furthermore, the axes of the photosensitive elements are arranged in such a manner that the intersections 24aa, 24ba and 24ca at which the axes of the photosensitive elements intersect the microfilm 10 correspond or coincide with the positions of said small signal marks 11a, 11b and 11c respectively. As shown in FIG. 4, within the drum 21 are disposed a light source 25 and a reflecting mirror 26 so that the edge portions $D_1, D_2, D_3, \ldots D_n$ of the roll microfilm 10 are illuminated as the microfilm 10 is advanced.

As clearly shown in FIG. 3, each group of the signal marks 11a, 11b and 11c for each frame have definite relationship or spacing which is repeated exactly for every other frame. For example, the spacing between marks 11a and 11b is less than the spacing between marks 11b and 11c. This disparity of the spacings or distances is critical to the invention to provide for precise alignment with the axes of the photoelectric elements and avoid any possible actuation by dust particles or the like which would not achieve such predetermined spacing. With respect to these photoelectric elements, the same disparate spacing is therefore necessary, and this is clearly seen in FIG. 4 where the distance between element 24a and 24b is less than the distance between elements 24b and 24c. It will be understood from a consideration of FIG. 4 that the individual disparate spacing between the photoelectric elements would be greater than the individual disparate spacing between the marks since the photoelectric elements are located on the an arc outside of drum 21 on which the microfilm is advanced. However, such individual disparate spacing of the two distances between the photoelectric elements bears the same ratio as the individual disparate spacing of the two distances between the marks so that when the axes of the photoelectric elements intersect the microfilm, an exact alignment with the small-size marks in each group is assured.

With the construction described hereinabove, when the roll microfilm 10 is advanced over the signal-sensing portions in the direction indicated by the arrows, each of small signal mark groups each consisting of three small signal marks 11a, 11b and 11c are simultaneously sensed by means of the potosensitive elements 24a, 24b and 24c so that the roll microfilm 10 is stopped at a predetermined frame thereof after the roll film has been advanced by a predetermined number of frames.

So far the present invention has been described as utilizing three black-colored small round signal marks 11a, 11b and 11c as small signal marks, but it will be understood that the shape and the number of the small signal marks are not limited to the round shape and three respectively, but they may be rectangular or polygonal in shape and their number may be more than three. Furthermore, it is to be understood that the color of a small signal mark is not limited to deep black but may be such that the contrast of the color can be distinguished from that of the edge portion, that is the mechanical base of the film.

Furthermore it must be understood that the member of illuminating the roll microfilm is not limited to the device as described hereinabove, but any other suitable illuminating device, may be utilized. For example, a white-colored reflecting plate may be disposed downwardly of the microfilm so that the lights illuminating the film from the above and being reflected by the white-colored reflecting plate may be advantageously utilized.

According to the present invention, the dimension of a signal mark can be reduced conveniently as described above so that the frames of the microfilm can be enlarged considerably as compared with the conventional frame size, whereby higher resolution power can be obtained without any adverse effect upon the retrieval efficiency and accuracy.

The present invention has been described in detail with particular reference to a preferred embodiment thereof, but it will be understood that variations and modifications can be effected within the spirit and scope of the present invention as described hereinabove and as defined in the appended claims.

It will be understood that na object of the invention is to allow the use of signal marks which are so small that the photosensitive detecting means capable of registering the presence of the signal mark may also register the presence of a dust particle, dirt speck, stain or other false mark of a size likely to be present on microfilm produced and handled in the ordinary manner. In the following claims the word "blemish" has been used to designate such false marks, whether they are incorporated into the film (as a stain, for example) or only temporarily present thereon (as, for example, a dust particle). While the exact size of such blemishes cannot be specified, the size of those likely to be encountered in a given application is usually known to workers in the art. As has been pointed out above, for example, it has been necessary in the prior art devices to use a square mark 2.5 mm. on a side to avoid using a photosensitive element sufficiently sensitive to be actuated improperly by blemishes in ordinary microfilm.

I claim:

1. In a roll microfilm-retrieving device for use with a microfilm having a series of picture frames each including a marking means in the border thereof comprising:
    a transparent rotatable drum interposed between a pair of guide rolls over which the microfilm is advanced;
    a stationary light source located on one side of the periphery of said drum; and
    a plurality of detecting elements each having an optical axis and located on the other side of the periphery of said drum;
   the improvement comprising:
        said detecting elements having a disparate spacing between an intermediate detecting element and adjacent detecting elements;
        said spacings corresponding to the spacings within said marking means which comprise a group of small-size marks corresponding in number to said detecting elements; and
        said detecting elements simultaneously sensing all marks in a group as the microfilm is advanced past said light source.

2. A device according to claim 1, in which the light source is located inside of said transparent drum and includes a reflecting mirror, and the detecting elements are aligned in the direction of longitudinal advancement of the microfilm and located outside of said transparent drum on an arc so that each respective axis of said detecting elements passes through said microfilm and intersects the center of said drum.

3. In combination with a roll microfilm-retrieving device comprising a transparent rotatable drum interposed between a pair of guide rolls, a stationary light source located on one side of the periphery of said drum, and a plurality of spaced-apart detecting elements each having an optical axis and located on the other side of said drum;
    a microfilm including a series of picture frames each having a border therearound and adapted to be advanced on said drum,
        each frame of said microfilm having a group of at least three small-size marks located within said border,
        the spacings on either side of an intermediate mark being disparate and corresponding to the spacings of said detecting elements.

4. A method of locating a desired position on a strip of material comprising the steps of
    providing a center mark and two outer marks on the strip, said marks being linearly arrayed parallel to a side of the strip, being positioned in a predetermined relation to the desired position, and being spaced with a first gap between one outer mark and the center mark different in length from a second gap between the center mark and the other outer mark;

passing the strip along a strip path in a direction parallel to the side of the strip beneath three detecting means, said detecting means being adapted to register the presence of one of the marks at a detection station, the detection stations being located in the path of the marks as the strip moves along the strip path and being spaced apart by gaps equal to the first and second gaps whereby the center mark and the outer marks each simultaneously pass different detecting stations as the strip moves along the strip path; and registering on the detecting means the simultaneous presence of the outer marks and the center mark at the detection stations.

5 The method of claim 4 wherein the center mark and the outer marks are of a size not substantially exceeding the size of the largest blemish to which the strip of material is likely to be subjected during use.

6. A device for locating a desired position on a strip of material, said strip of material having a center mark and two outer marks on opposite sides of the center mark, said marks being linearly arrayed parallel to a side edge of the strip in a predetermined relation to the desired position, and the first gap between one outer mark and the center mark being different in length from the second gap between the other outer mark and the center mark, said device comprising transport means for moving the strip in a direction parallel to the side edge thereof past three detection stations, said detection stations being in the path of the marks and spaced from each other by gaps equal to the first and second gaps whereby the center mark and the outer marks each simultaneously pass different detecting stations as the strip moves along the strip path; and detecting means for simultaneously detecting the presence at the detecting stations of the outer marks and center mark.

7. The device of claim 6 wherein the detecting means is sufficiently sensitive to be activated by marks of magnitude equal to the reasonably expectable blemishes on the strip.

8. A device comprising:

a microfilm strip adapted for projection in a microfilm projector and having a border area adjacent an image-bearing area, said border area being subject to accidental marking by blemishes not exceeding a given size;

means for indicating a chosen location on the strip, said means comprising a center mark and two outer marks linearly positioned on either side of the center mark equidistant from an edge of the strip and placed in a predetermined position with regard to the chosen location, the gap between the center mark and one outer mark being different in length from the gap between the center mark and the other outer mark, said marks being of a size not substantially exceeding the given size;

transport means for moving the strip in a direction parallel to the side edge thereof past three detection stations, said detection stations being in the path of the marks and spaced from each other by gaps equal to the first and second gaps whereby the center mark and the outer marks each simultaneously pass different strip path; and detecting means for simultaneously detecting the presence at the detecting stations of the outer marks and the center marks, said detecting means being sufficiently sensitive to be activated by marks of magnitude equal to the reasonably expectable blemishes on the strip.